United States Patent
Kumagawa

(10) Patent No.: US 10,239,551 B2
(45) Date of Patent: Mar. 26, 2019

(54) STEERING WHEEL DEVICE

(71) Applicants: AUTOLIV DEVELOPMENT AB, Vargarda (SE); Hiroyasu Kumagawa, Kanagawa (JP)

(72) Inventor: Hiroyasu Kumagawa, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/758,355

(22) PCT Filed: Dec. 13, 2013

(86) PCT No.: PCT/JP2013/083472
§ 371 (c)(1),
(2) Date: Jun. 29, 2015

(87) PCT Pub. No.: WO2014/103752
PCT Pub. Date: Jul. 3, 2014

(65) Prior Publication Data
US 2015/0353120 A1 Dec. 10, 2015

(30) Foreign Application Priority Data
Dec. 28, 2012 (JP) ................. 2012-287553

(51) Int. Cl.
*B62D 1/10* (2006.01)
*B62D 1/11* (2006.01)

(52) U.S. Cl.
CPC ............. *B62D 1/10* (2013.01); *B62D 1/11* (2013.01); *Y10T 74/20834* (2015.01)

(58) Field of Classification Search
CPC .................................. B62D 1/10; B62D 1/11
USPC ............................................. 74/552
See application file for complete search history.

(56) References Cited

U.S. PATENT DOCUMENTS

| 4,061,054 | A | * | 12/1977 | Wenninger | B62D 1/10 188/371 |
| 4,116,087 | A | * | 9/1978 | Zeller | B62D 1/11 188/371 |
| 5,356,178 | A | * | 10/1994 | Numata | B60R 21/203 188/377 |

(Continued)

FOREIGN PATENT DOCUMENTS

| DE | 10144143 C1 | * | 8/2002 | ........... G01L 3/1457 |
| DE | 102009057809 A1 | * | 6/2011 | ........... G01L 3/1457 |
| DE | 102010017851 A1 | * | 10/2011 | ............... B62D 1/10 |

(Continued)

*Primary Examiner* — Vicky A Johnson
(74) *Attorney, Agent, or Firm* — Brinks Gilson & Lione

(57) ABSTRACT

A steering wheel device that can absorb an applied impact load. A steering wheel device includes a lower cover that covers a steering column side of the steering wheel. The lower cover includes: a bottom member facing the steering column; an open portion which at a center of the bottom member and through which a steering shaft passes; slit portions formed on both sides, the slit portions being bent and curved in predetermined shapes; buffer portions formed in the bottom member and outlined by the slit portions, the buffer portions having a free end formed on a vehicle front side and a stationary end formed on a vehicle rear side; and bridge members that can be broken and bridge each of slit portions on the free end side of each of the buffer portions.

11 Claims, 6 Drawing Sheets

(56) References Cited

U.S. PATENT DOCUMENTS

| | | | | | |
|---|---|---|---|---|---|
| 6,126,193 | A | * | 10/2000 | Hosoi | B62D 1/11 |
| | | | | | 280/728.2 |
| 2008/0053268 | A1 | * | 3/2008 | Matsu | B62D 1/11 |
| | | | | | 74/558.5 |

FOREIGN PATENT DOCUMENTS

| | | | | |
|---|---|---|---|---|
| DE | 102005023182 B4 | * | 4/2014 | G01L 3/1478 |
| FR | 2463708 A1 | * | 2/1981 | |
| JP | 62-99471 | | 6/1987 | |
| JP | 4-224463 | | 8/1992 | |
| JP | 9-76854 | | 3/1997 | |
| JP | 2010-502495 | | 1/2010 | |
| JP | 2010-152664 | | 3/2010 | |
| JP | 2010-125990 | | 8/2010 | |

\* cited by examiner

A-A

B-B

STEERING WHEEL DEVICE

CROSS REFERENCE TO RELATED APPLICATIONS

This application claims priority to Japanese Patent Application no. 2012-287553, filed Dec. 28, 2012 and PCT International Patent Application No. PCT/JP2013/083472, filed on Dec. 13, 2013.

1. FIELD OF THE INVENTION

The present invention relates to a steering wheel device including a steering wheel connected to a steering column of a vehicle and a lower cover that covers a steering column side of the steering wheel.

2. DESCRIPTION OF THE RELATED ART

A steering wheel is a member that an occupant of a vehicle operates to change a traveling direction of the vehicle. A steering shaft that transfers operation force of the steering wheel to a steering gear (unit that changes an orientation of tires) is connected to the steering wheel. The steering gear is operated through the steering shaft.

Generally, a horn switch is disposed at the center on an occupant side of the steering wheel. At present, an air bag module often functions as a horn switch. On the other hand, disposed on a rear side of the steering wheel, namely on an instrument panel side, is a lower cover. The rear side is connected to the steering column that cylindrically covers the steering shaft.

Since the steering wheel is located in front of the occupant, when a deceleration of the vehicle occurs, the steering wheel is also a member that the occupant most likely contacts. When a frontal impact air bag is activated, a load is applied to the steering wheel to some extent. To solve such a problem, for example Japanese Patent Application Laid-Open No. H9-76854 has a structure including a groove-shaped bottom breakable member formed on a bottom surface of the lower cover and edged breakable members on side surfaces of the lower cover so that these portion absorb a shock applied to the steering wheel, whereby when such a shock is applied the lower cover is broken to absorb the same.

SUMMARY OF THE INVENTION

However, in the structure disclosed in Japanese Patent Application Laid-Open No. H9-76854, the shallow groove-shaped breakable members are formed in a wide area of the lower cover. As a result, the rigidity of the lower cover is likely to decrease. For example, while the vehicle is traveling, the shallow groove-shaped breakable members may vibrate and generate noise. In addition, although the entire lower cover is largely cleaved so that this cover is widely spread, from, for example, a viewpoint of occupant safety, the steering wheel desirably has a structure that can absorb an impact while being subjected to deformation only at a limited scale.

The present invention is made from the foregoing point of view and an object of the present invention is to provide a steering wheel device that can absorb an impact load applied to the steering wheel device in case of emergency or the like since the steering device is subjected to deformation only at a limited scale.

To solve the foregoing problem, a steering wheel device according to the present invention typically includes: a steering wheel that is connected with a steering column of a vehicle; and a lower cover that covers a steering column side of the steering wheel, wherein the lower cover includes: a bottom member facing the steering column; an open portion which is formed at a center of the bottom member and through which a steering shaft extending from the steering column to the steering wheel passes; slit portions formed on both sides, in a vehicle width direction, of the open portion of the bottom member, with the slit portions being bent and curved in predetermined shapes; buffer portions formed in the bottom member and fringed by the slit portions, with these buffer portions each having a free end formed on a vehicle front side and a stationary end formed on a vehicle rear side; and bridge members that can be broken and bridge respective slit portions on the free end side of each of the buffer portions.

When a deceleration or an acceleration occurs in a vehicle in case of emergency, an occupant of the vehicle is likely to inertially and downwardly contact a circumferential portion on an occupant's front side, namely a vehicle's rear side of the steering wheel. In such a case, an end of the portion is pushed downwardly. As a result, since force is applied to the lower cover, free ends of buffer portions are raised based on the principle of leverage. Thus, the lower cover breaks bridge members and thereby further bends. Through this series of developments, the lower cover can absorb a shock. In addition, only the bridge members are broken. The lower cover is regularly deformed as designed. An inner unit such as a paddle switch of the steering wheel passes through the lower cover. Thus, the inner unit of the steering wheel can be prevented from interfering with the lower cover. As a result, the steering wheel device according to the present invention is advantageous from a safety point of view.

The bridge members may be thinner than the bottom member. As a result, the bridge members that are effectively broken can be accomplished.

The bridge members may each have a narrow width portion formed at a center thereof in a longitudinal direction, the narrow width portion being narrower than a neighboring portion of each of the bridge members. As a result, the bridge members that are effectively broken can be accomplished.

The bridge members may have a groove portion formed at the center thereof in the longitudinal direction, with the groove portion being formed to extend over a width of each of the bridge members. As a result, the bridge members that are effectively broken can be accomplished.

The free end of each of the buffer portions may be formed in a letter M-shape. The bridge members may bridge two tip portions of the M-shape of the free end. As a result, the bridge members that are effectively broken and the buffer portions that absorb a shock can be accomplished.

The free end of each of the buffer portions may be formed in an arc shape. As a result, the buffer portions that absorb a shock can be accomplished.

The free end of each of the buffer portions may be formed in a letter U-shape. As a result, the buffer portions that absorb a shock can be accomplished.

According to the present invention, a steering wheel device is provided, which can absorb a shock applied to the steering wheel device in case of emergency or the like since the steering device is subjected to deformation only at a limited scale.

DESCRIPTION OF THE PREFERRED EMBODIMENTS

Figure 1:
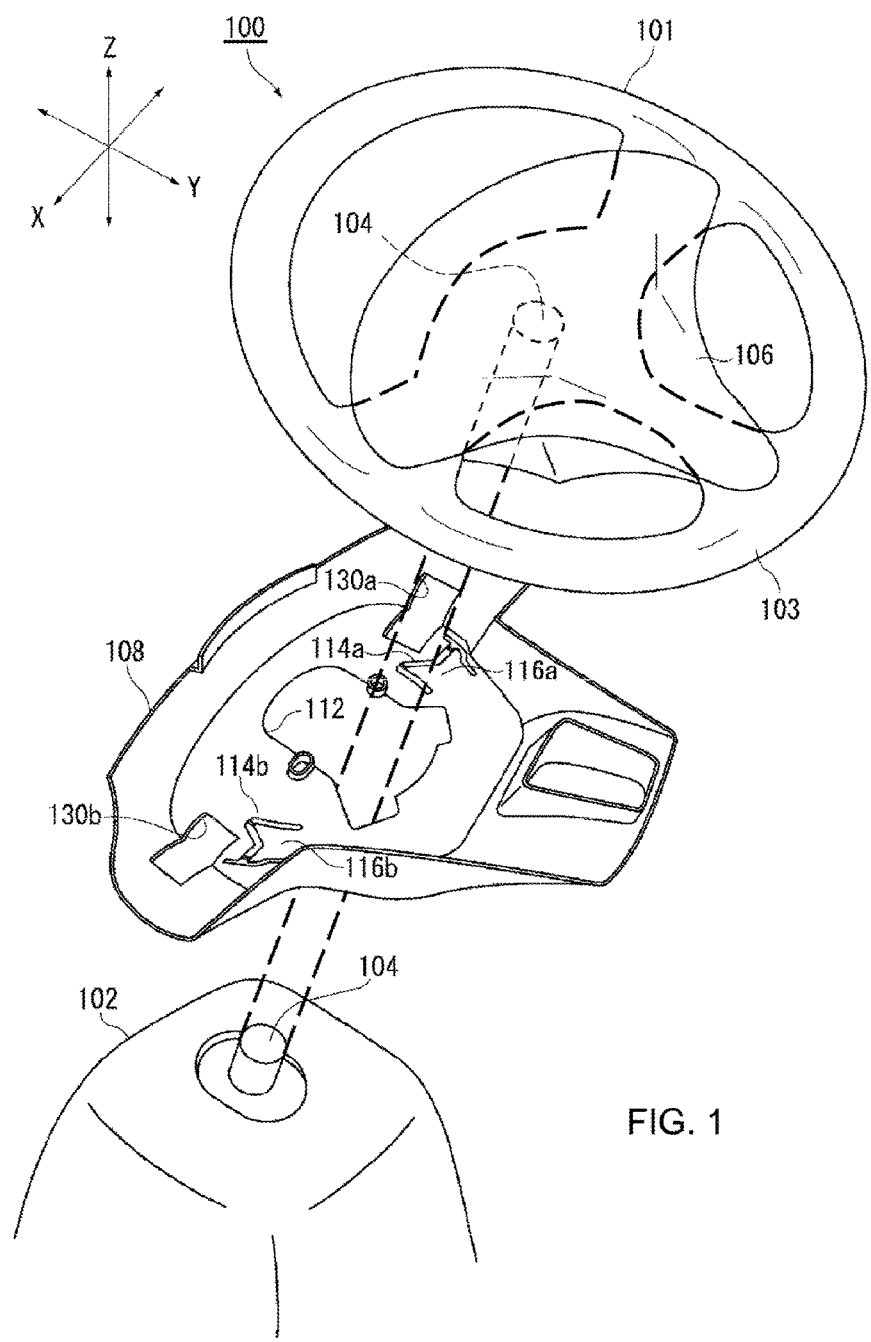
FIG. 1 is a schematic diagram exemplifying an outlined structure of a steering wheel device according to an embodiment of the present invention.

Next, with reference to accompanying drawings, preferred embodiments of the present invention will be described. Dimensions, materials, and other specific numerical values represented in the embodiments are described as examples for easier understanding of the present invention, but they do not limit the present invention unless otherwise specified. In addition, in the specification and drawings, elements that have substantially same functions and/or structures are denoted by similar reference numerals so as to omit redundant description. Moreover, elements out of the scope of the present invention are not illustrated in the drawings.

FIG. 1 is a schematic diagram exemplifying an outlined structure of a steering wheel device 100 according to an embodiment of the present invention. In the following drawings including FIG. 1, the steering wheel device 100 is mounted to a vehicle so that a direction that a steering column 102 (with steering shaft 104) extends is a Z axis. Assuming that a steering wheel 101 is located at 12 o'clock of a 12-hour clock on a plane that intersects at right angles with the Z axis and that the 12 o'clock side is a vehicle's front side, a direction from 9 o'clock to 3 o'clock is an X axis and a direction from 6 o'clock to 12 o'clock is a Y axis.

The steering wheel 101 is connected with a steering shaft 104 (indicated as a projection of the steering shaft 104 onto the steering wheel 101 in broken lines) that passes through the steering column 102 and transfers operation force of an occupant to a steering gear (not illustrated) and so forth. Disposed at a center of the steering wheel 101 is an air bag module 106 that encloses a frontal impact air bag.

A side of the steering wheel 101 facing steering column 102 is covered with a lower cover 108. The lower cover 108 is an exposed exterior member that is made of a resin and that is mounted on the steering wheel 101. In case of a vehicle deceleration, the steering wheel 101 is a member that an occupant most likely contacts. When the front air bag is activated, the steering wheel 101 is subject to a load. According to the present embodiment, the lower cover 108 is formed according to a unique design so as to absorb a shock applied to the steering wheel 101.

Figure 2A:
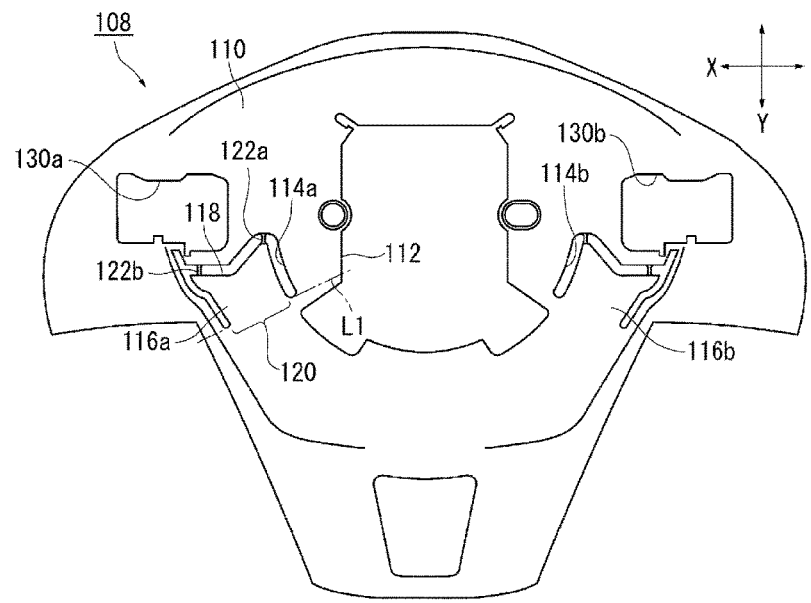
FIGS. 2A and 2B are schematic diagrams showing independently an example of a structure of a lower cover illustrated in FIG. 1.
Figure 2B:
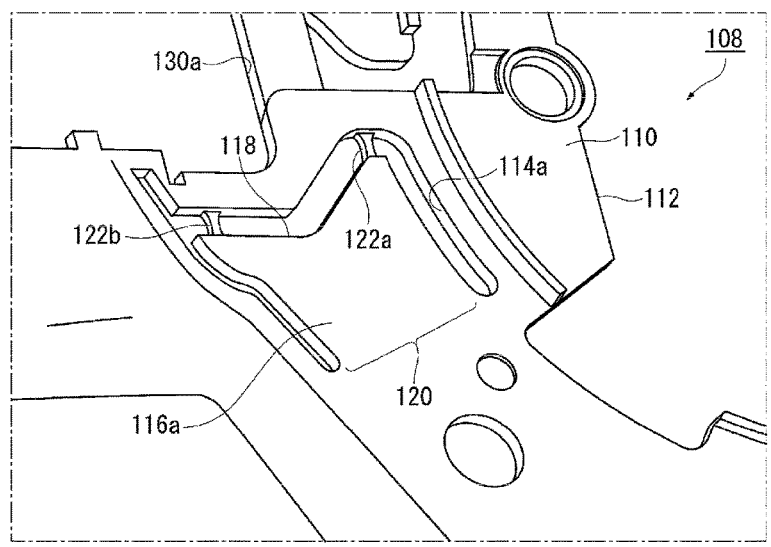

FIGS. 2A and 2B are diagrams showing independently an example of the lower cover 108 illustrated in FIG. 1. FIG. 2A is a bottom view illustrating an overall structure of the lower cover 108. A bottom member 110 is a member facing the steering column 102 illustrated in FIG. 1. Formed at a center of the bottom member 110 is an open portion 112 through which the steering shaft 104 passes (refer to broken lines of projected steering shaft 104 in FIG. 1). In addition, formed on both sides of a vehicle's width direction (that nearly matches the X axis direction) are paddle switch enclosure holes 130a, 130b that enclose paddle switches represented by paddle shifts 132 (see FIG. 4C) as examples of other open portions that enclose any units. In addition, formed below the paddle switch enclosure holes 130a, 130b and on both the sides in the vehicle's width direction of the open portion 112 are slit portions 114a, 114b and buffer portions 116a, 116b that are original structures of the steering wheel device 100.

In the following description, the slit portion 114a and the buffer portion 116a as representatives of the two slit portions 114a, 114b and the buffer portions 116a, 116b will be described. FIG. 2B is an enlarged perspective view illustrating structures of the slit portion 114a and the buffer portion 116a illustrated in FIG. 2A. The slit portion 114a and the buffer portion 116a are structured to absorb a shock occurring on the lower cover 108 in case of emergency. The slit portion 114a is a slit that forms a buffer portion on the bottom member 110 that is bent and curved in a letter M-shape. The buffer portion 116a is outlined by the slit portion 114a and formed on the bottom member 110. In addition, the buffer portion 116a has a free end 118 on the vehicle's front side (on an upper left side of the figure) and a stationary end 120 on the vehicle's rear side (on a lower right side of the figure).

According to the present embodiment, the free end 118 of the buffer portion 116a is formed in the M-shape having two tip portions on both width sides of the free end 118. Bridge members 122a, 122b bridge the slit portion 114a at the two tip portions of the M-shaped free end 118. The bridge members 122a, 122b are members that bridge the slit portion 114a between the free end 118 of the buffer portion 116a and an opposite region of the bottom member 110. In a normal operation of the vehicle, the bridge members 122a, 122b maintain the rigidity of the lower cover 108 and prevent the lower cover 108 from vibrating and generating a noise.

Figure 3A:
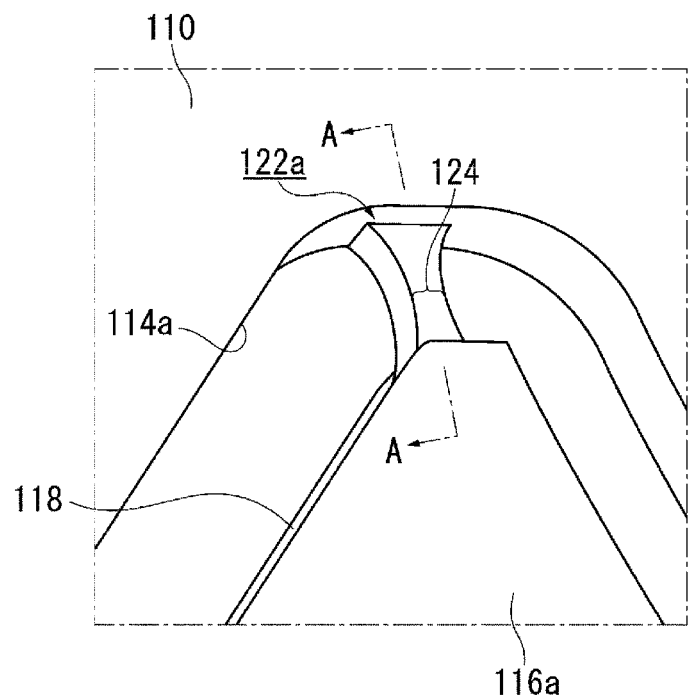
FIGS. 3A and 3B are enlarged views illustrating a structure of a bridge member illustrated in FIG. 2B.
Figure 3B:
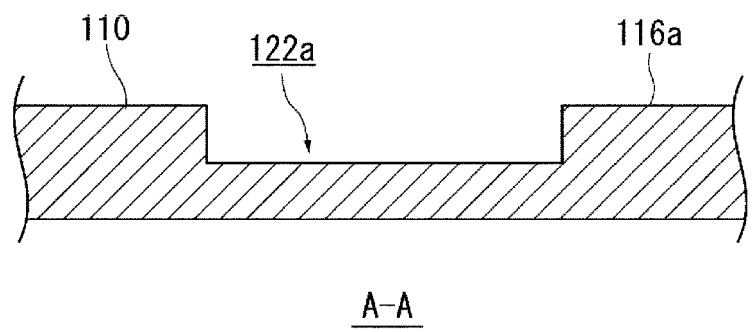

FIGS. 3A and 3B are enlarged views illustrating a structure of the bridge member 122a illustrated in FIG. 2B. In case of emergency, when a shock is applied to the steering wheel 101 (refer to FIG. 1), the bridge member 122a in FIG. 3A is broken in accordance with bending in the steering wheel 101. According to the present embodiment, a narrow width portion 124 is formed at a center of a longitudinal direction of the bridge member 122a so that the bridge member 122a is effectively broken. The narrow width portion 124 is narrower than neighboring portions of the bridge member 122a so that the narrow width portion 124 is easily broken.

FIG. 3B is a sectional view taken along line A-A of FIG. 3A. As exemplified in FIG. 3B, according to the present embodiment, the bridge member 122a is thinner than the neighboring bottom member 110 and the neighboring buffer portion 116a. Thus, the bridge member 122a is effectively broken compared with the neighboring bottom member 110 and the neighboring buffer portion 116a.

Figure 4A:
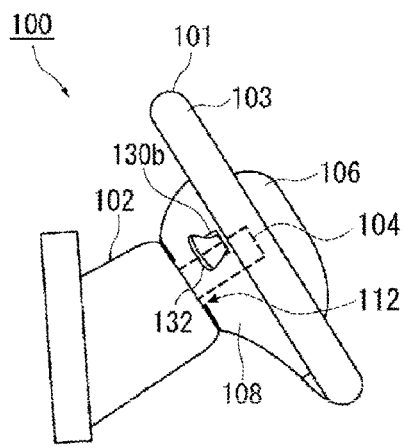
FIGS. 4A to 4D are schematic diagrams exemplifying deformation of a steering wheel illustrated in FIG. 1 when a load is applied to the steering wheel.
Figure 4C:
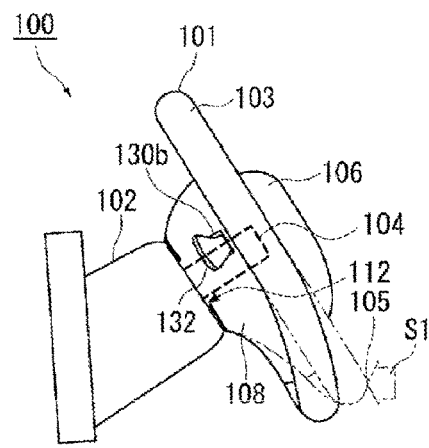
Figure 4B:
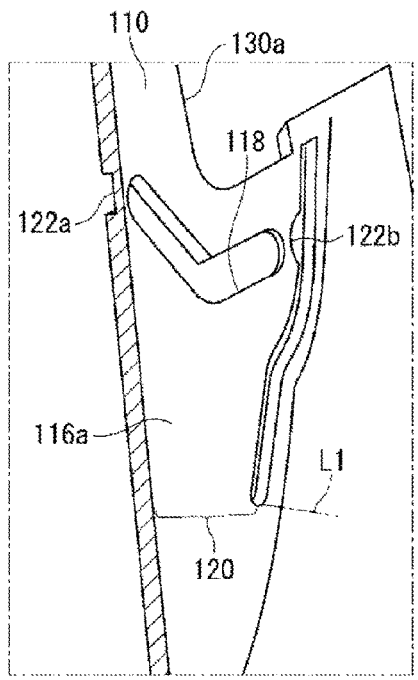

FIGS. 4A to 4D are schematic diagrams exemplifying deformation of the steering wheel 101 illustrated in FIG. 1 when a load is applied thereto. In FIGS. 4A and 4C, the steering shaft 104 is schematically indicated in broken lines. FIG. 4A exemplifies the steering wheel 101 mounted on a vehicle. As exemplified in FIG. 4A, the lower cover 108 is disposed between a main body (including members such as a rim 103 and the air bag module 106) of the steering wheel 101 and the steering column 102. FIG. 4B is a partial perspective sectional view illustrating a neighboring portion of the buffer portion 116a in the lower cover 108 illustrated in FIG. 4A. FIG. 4B exemplifies a state where a shock is not yet applied to the steering wheel 101, hence no change has not yet occurred in the buffer portion 116a.

FIG. 4C exemplifies a state where a load is applied to a lower part of the steering wheel 101 illustrated in FIG. 4A. In other words, the state illustrated in FIG. 4C denotes that how a load is applied to the steering wheel 101 in case of emergency. When a deceleration or an acceleration occurs in a vehicle in case of emergency, an occupant inertially and almost downwardly contacts any part (for example, a lower part 105) of the rim 103 from an occupant's front side, namely on the vehicle's rear side (on the right side of the figure) of the steering wheel 101. In FIG. 4C, a shock applied to the steering wheel 101 by touching of the occupant is represented by an arrow S1.

In FIG. 4C, a paddle shift 132 is disposed as an example of a member that passes through the paddle switch enclosure hole 130b explained with reference to FIG. 2A. When there is a unit such as the paddle shift 132 that passes through the lower cover 108, in a case where a load such as the shock S1 is applied, the lower cover 108 may be caused to deform and move, following the rim 103. As a result, the lower cover 108 may interfere with the paddle shift 132. Thus, the paddle shift 132 and the lower cover 108 may malfunction. However, when the steering wheel device 100 is used, the buffer portion 116a illustrated in FIG. 4B functions as a means to effectively solve such a problem.

Figure 4D:
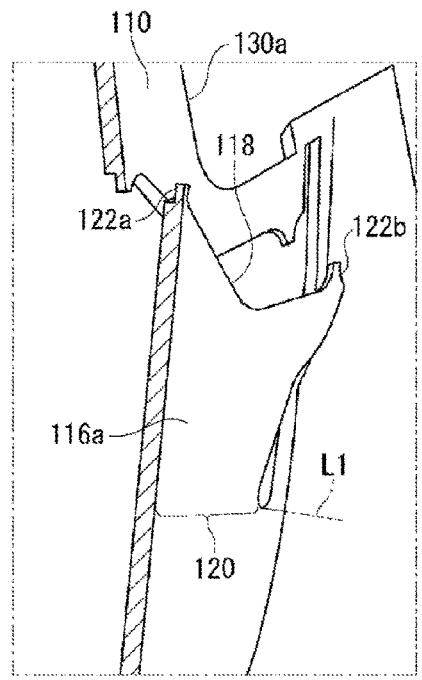

FIG. 4D exemplifies the buffer portion 116a in a state established when the steering column 102 is in a state as illustrated in FIG. 4C. As exemplified in FIG. 4D, when the lower part 105 of the rim 103 (refer to FIG. 4C) is pressed downwardly, a load is applied to the buffer portion 116a based on the principle of leverage so that the free end 118 is raised. As a result, the bridge members 122a, 122b are broken. In particular, according to the present embodiment, since the bridge members 122a, 122b are disposed at the tip portions of the M-shaped free end 118, a load can be effectively applied to the bridge members 122a, 122b. As a result, the bridge members 122a, 122b can be broken. In addition, the rim 103 causes a region below an extension line L1 that connects the ends of the slit portion 114a (refer to FIG. 2A) as a bending line to be bent and deformed. This series of developments allows the lower cover 108 to absorb a shock (arrow S1 illustrated in FIG. 4C). On the other hand, the rim 103 does not remarkably cause the region above the extension line L1 of the lower cover 108 to be largely deformed and moved. As a result, the lower cover 108 can be prevented from interfering with the paddle shift 132 exemplified in FIG. 4C.

If an occupant forceably contacts the steering wheel 101 according to the present embodiment, a reaction exerted on the occupant from the steering wheel 101. In addition, only the bridge members 122a, 122b are broken and they are not largely deformed. Since only the bridge members 122a, 122b are broken, the lower cover 108 can be regularly deformed as designed. Thus, when the lower cover 108 is deformed, it can be prevented from interfering with the paddle shift 132 and other inner structures of the steering wheel 101. In addition, since only the bridge members 122a, 122b are broken and interference with internal structures other than these members in the lower cover 108 are prevented, scattering of broken pieces is inhibited. Thus, the steering wheel 101 is advantageous from a safety point of view.

Figure 5:
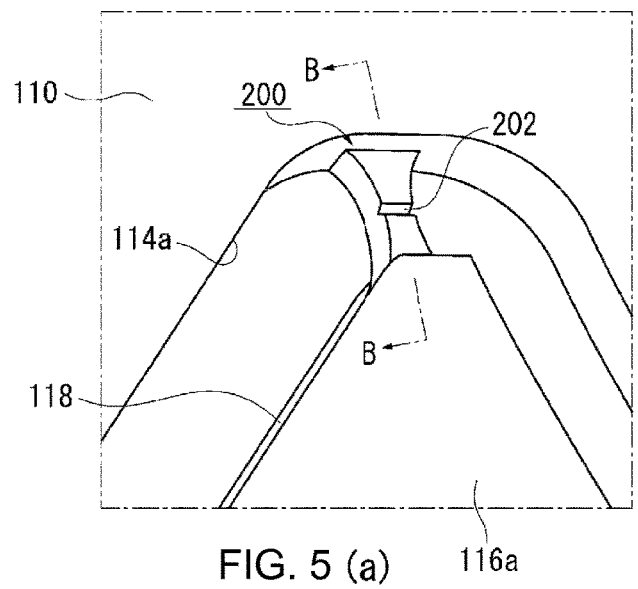
FIGS. 5A to 5C are diagrams illustrating a modification of the bridge member illustrated in FIGS. 3A and 3B.
Figure 5:
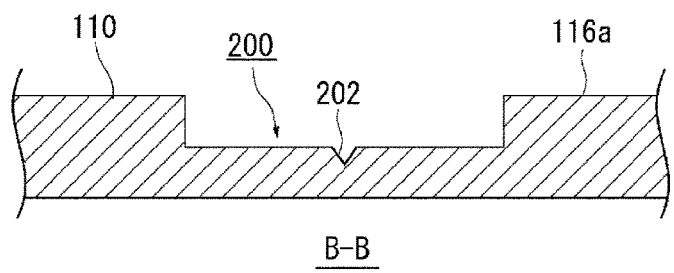
Figure 5C:
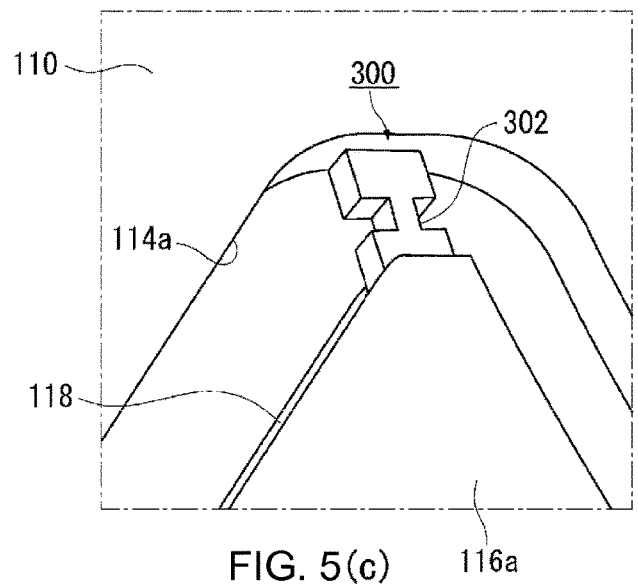

FIGS. 5A to 5C illustrate bridge members according to modifications of the bridge member 122a illustrated in FIGS. 3A and 3B. As exemplified in FIG. 5A, a groove portion 202 is formed at a center in a longitudinal direction of a bridge member 200 so that the groove portion 202 extends for a width of the bridge member 200. FIG. 5B is a sectional view taken along line B-B of FIG. 5A. As shown in FIG. 5B, the prove portion 202 may be provided in the form of a cut. Since the groove portion 202 allows a load to be concentrated thereto, the bridge member 200 can be effectively broken along the groove portion 202.

FIG. 5C is a schematic diagram exemplifying a bridge member 300 according to another modification of the present invention. Unlike the bridge member 122a illustrated in FIG. 3A and FIG. 3B, the bridge member 300 is linearly formed. Since a narrow width portion 302 is formed at a center in a longitudinal direction of the bridge member 300, the bridge member 300 can be easily broken.

Figure 6:
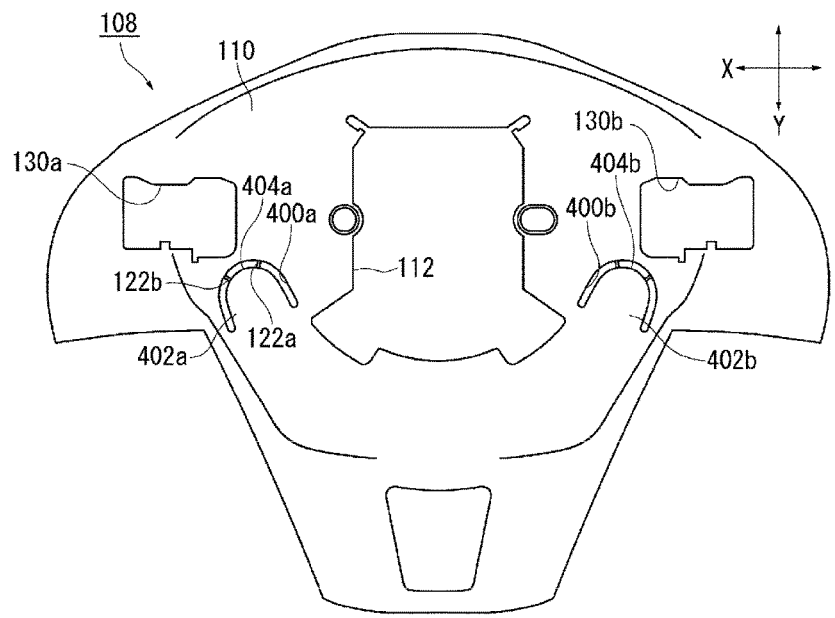
FIGS. 6A and 6B are diagrams illustrating modifications of the slit portion and the buffer portion illustrated in FIGS. 2A and 2B.
Figure 6:
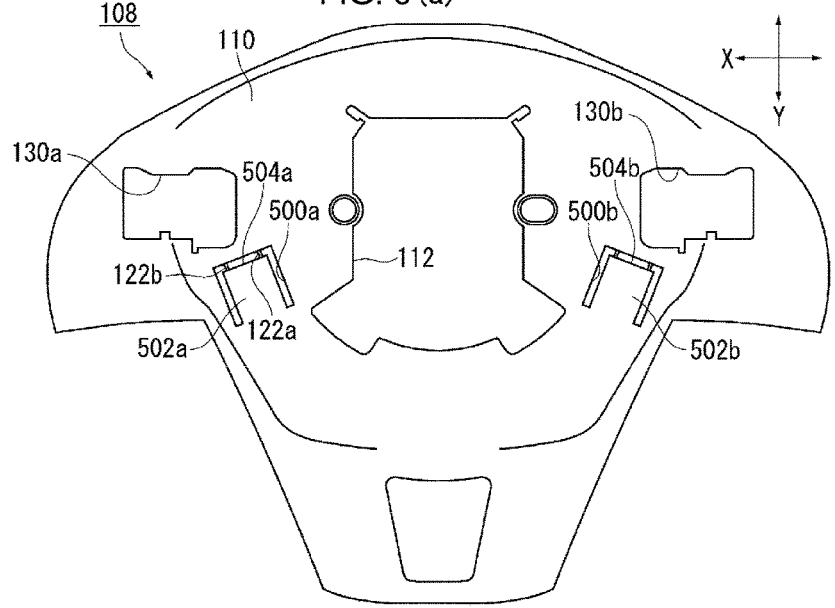

FIGS. 6A and 6B are diagrams illustrating modifications of the slit portion 114a and the buffer portion 116a illustrated in FIGS. 2A and 2B. As exemplified in FIG. 6A, slit portions 400a, 400b and buffer portions 402a, 402b may be formed such that free ends 404a, 404b of the buffer portions 402a, 402b are formed in arc shapes. Alternatively, as exemplified in FIG. 6B, slit portions 500a, 500b and buffer portions 502a, 502b may be formed such that free ends 504a, 504b of the slit portion 500a are formed in letter U-shapes. When shocks are applied to these structures, since the bridge members 122a, 122b are broken and the lower cover 108 is bent, the shocks can be absorbed.

With reference to the accompanying drawings, preferred embodiments of the present invention have been described. The foregoing embodiments are preferred embodiments of the present invention. Thus, other embodiments can be implemented or accomplished based on various methods. The present invention is not limited by shapes, dimensions, structures, arrangements, and so forth of members and portions illustrated in the accompanying drawings unless otherwise described in the specification of the present application. Expression and terms used in the specification of the present application intend to describe the present invention, but not limited thereto unless otherwise described therein.

The present invention can be applied to a steering wheel device including a steering wheel connected with a steering column of a vehicle and a lower cover that covers a steering column side of the steering wheel.

While the above description constitutes the preferred embodiment of the present invention, it will be appreciated that the invention is susceptible to modification, variation and change without departing from the proper scope and fair meaning of the accompanying claims.

What is claimed is:
1. A steering wheel device comprising:
   a steering wheel that is connected with a steering column of a vehicle; and
   a lower cover that covers a steering column side of the steering wheel, wherein the lower cover includes:
      a bottom member facing the steering column;
      an open portion which is formed at a center of the bottom member and through which a steering shaft passes, which extends from the steering column through and past the open portion to the steering wheel and has an end remote from the steering column that engages the steering wheel, the shaft being in indirect contact with the bottom member via the steering wheel;

at least one slit portion formed on at least one lateral side of the open portion of the bottom member, with the slit portion being curved in shape;

at least one buffer portion formed in the bottom member and outlined by the slit portion, with the buffer portion having a free end formed on a vehicle front side and a stationary end formed on a vehicle rear side; and at least one bridge member that bridges across the slit portion on the free end of the buffer portion which bridge member is adapted to be broken to allow the buffer portion to be displaced relative to portions of the bottom member adjacent to the buffer portion.

2. The steering wheel device according to claim 1, wherein the bridge member is thinner than the portions of the bottom member adjacent to the buffer portion.

3. The steering wheel device according to claim 1, wherein the bridge member has a narrow width portion formed at a center thereof in a longitudinal direction, the narrow width portion being narrower than a neighboring portion of the bridge member.

4. The steering wheel device according to claim 1, wherein
the slit portion forms a letter M shape,
the free end of the buffer portion is formed in a letter M shape, and
the bridge member bridges two tip portions of the M-shape of the free end.

5. The steering wheel device according to claim 1, wherein the slit portion forms an arc shape,
wherein the free end of the buffer portion is formed in an arc shape.

6. The steering wheel device according to claim 1, wherein the slit portion forms a letter U shape,
wherein the free end of the buffer portion is formed in a U shape.

7. The steering wheel device according to claim 1, wherein the buffer portion free end is oriented in a generally upward direction with respect to the vehicle and the stationary end of the buffer portion is oriented in a generally downward direction with respect to the vehicle.

8. The steering wheel device according to claim 1, wherein the at least one bridge member is adapted to be broken in response to a vehicle impact in which an occupant of the vehicle forcibly contacts the steering wheel and wherein after breaking every at least one bridge member, the steering shaft remains engaged with the steering wheel.

9. A steering wheel device comprising:
a steering wheel that is connected with a steering column of a vehicle; and
a lower cover that covers a steering column side of the steering wheel, wherein the lower cover includes:
a bottom member facing the steering column;
an open portion which is formed at a center of the bottom member and through which a steering shaft extending from the steering column to the steering wheel passes;
at least one slit portion formed on at least one lateral side of the open portion of the bottom member, with the slit portion being curved in shape;
at least one buffer portion formed in the bottom member and outlined by the slit portion, with the buffer portion having a free end formed on a vehicle front side and a stationary end formed on a vehicle rear side; and
at least one bridge member that bridges across the slit portion on the free end of the buffer portion which bridge member is adapted to be broken to allow the buffer portion to be displaced relative to portions of the bottom member adjacent to the buffer portion;
wherein the bridge member has a groove portion formed at a center thereof in a longitudinal direction, with the groove portion being formed to extend over a width of the bridge member.

10. A steering wheel device comprising:
a steering wheel that is connected with a steering column of a vehicle; and
a lower cover that covers a steering column side of the steering wheel, wherein the lower cover includes:
a bottom member facing the steering column;
an open portion which is formed at a center of the bottom member and through which a steering shaft extending from the steering column to the steering wheel passes;
at least one slit portion formed on at least one lateral side of the open portion of the bottom member, with the slit portion being curved in shape;
at least one buffer portion formed in the bottom member and outlined by the slit portion, with the buffer portion having a free end formed on a vehicle front side and a stationary end formed on a vehicle rear side; and
at least one bridge member that bridges across the slit portion on the free end of the buffer portion which bridge member is adapted to be broken to allow the buffer portion to be displaced relative to portions of the bottom member adjacent to the buffer portion; and at least one paddle switch enclosure hole separated from the slit portion and the buffer portion and providing passage of at least one paddle shift.

11. The steering wheel device according to claim 10, wherein, upon deformation of the buffer portion and breaking of the at least one bridge member resulting from a vehicle impact in which an occupant of the vehicle forcibly contacts the steering wheel, the at least one paddle shift remains operable.

* * * * *